(12) United States Patent
Tani et al.

(10) Patent No.: US 7,188,911 B2
(45) Date of Patent: Mar. 13, 2007

(54) BRAKE DEVICE FOR A TWO-WHEELED MOTOR VEHICLE, AND METHOD OF USING SAME

(75) Inventors: Kazuhiko Tani, Saitama (JP);
Masanobu Nakayama, Saitama (JP);
Yukimasa Nishimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/038,859

(22) Filed: Jan. 20, 2005

(65) Prior Publication Data

US 2005/0168060 A1 Aug. 4, 2005

(30) Foreign Application Priority Data

Jan. 30, 2004 (JP) .............................. 2004-024043

(51) Int. Cl.
*B60T 13/00* (2006.01)
(52) U.S. Cl. ..................... 303/9.64; 303/170; 303/137; 303/9.61
(58) Field of Classification Search ................ 303/163, 303/9.63, 9.64, 170 X, 137 X, 9.61 X, 15
See application file for complete search history.

(56) References Cited

U.S. PATENT DOCUMENTS 5,934,771 A * 8/1999 Ishikawa et al. ............ 303/163
6,062,660 A * 5/2000 Matsuno et al. ............ 303/173
6,089,682 A * 7/2000 Ishikawa et al. ............ 303/163
6,409,285 B1 * 6/2002 Wakabayashi et al. ...... 303/9.64
6,557,949 B2 * 5/2003 Tani et al. .................. 303/9.64
6,685,282 B2 * 2/2004 Sakamoto .................... 303/170

FOREIGN PATENT DOCUMENTS

DE 3931313 A * 3/1991
JP 08150925 6/1996

* cited by examiner

*Primary Examiner*—Melanie Torres
(74) *Attorney, Agent, or Firm*—Carrier, Blackman & Associates, P.C.; William D. Blackman; Joseph P. Carrier

(57) ABSTRACT

A braking device for a motorcycle, in which front wheel braking means is operated in conjunction with a braking operation on a rear wheel, eliminates a rapid change in front/rear braking force distribution at the time of a rear wheel braking operation so as to consistently allow a rider to feel a smooth braking operation. Braking force distribution characteristics on the rear and front wheels are previously set for each vehicle speed. When the braking operation on the rear wheel is performed, a brake caliper on the front wheel is controlled so as to maintain braking force distribution characteristics corresponding to a vehicle speed when the operation is started.

9 Claims, 15 Drawing Sheets

PRIOR ART

PRIOR ART

BRAKE DEVICE FOR A TWO-WHEELED MOTOR VEHICLE, AND METHOD OF USING SAME

CROSS-REFERENCE TO RELATED APPLICATIONS

The present invention claims priority under 35 USC 119 based on Japanese patent application No. 2004-024043, filed on Jan. 30, 2004. The subject matter of these priority documents is incorporated by reference herein.

BACKGROUND OF THE INVENTION

1. Field of the Invention

The present invention relates to a braking device of a two-wheeled motor vehicle, and more particularly to a braking device for a motorcycle, which can operate front wheel braking means in conjunction with a braking operation on a rear wheel.

2. Description of the Background Art

A braking device for a motorcycle which can operate front wheel braking means in conjunction with a braking operation on a rear wheel is described in Japanese Patent Laid-Open No. Hei 8 (1996)-150925. In the braking device described Japanese Patent Laid-Open No. Hei 8 (1996)-150925, respective brake operating units of front and rear wheels and wheel braking means are coupled to each other using wire, respectively. An assist means using an electric actuator is coupled to each of front and rear braking systems through the wire. When there is an input to the brake operating unit of one of the front and rear wheel, force is applied to the front and rear braking systems from the assist means, respectively. The force applied depends on vehicle speed and a brake manipulated variable such as the hydraulic pressure on the input side of the brake circuit. Therefore, for example, when the brake operating unit on the rear wheel is operated by a rider under conditions where the vehicle travels at a certain speed, control force depending on the vehicle speed and the brake manipulated variable is applied to the front wheel braking means through the wire from the assist means.

However, the braking device takes the form of the vehicle speed being detected when a braking operation on the rear wheel is performed, and braking force being distributed to the rear and front wheels depending on the vehicle speed. Thus, until the vehicle is stopped after the braking operation on the rear wheel is started, even if the brake manipulated variable is constant, braking force distribution to the rear and front wheels is changed. Consequently, when the braking device is applied to a motorcycle of which maximum speed is fast, there may occur a deceleration change (see FIG. 17) of such an extent that the rider feels uncomfortable due to the change in the front/rear braking force distribution during deceleration from a high-speed driving state.

It is an object of the present invention to provide a braking device for a motorcycle, which can always allow a rider to feel a smooth braking operation by eliminating a rapid change in front/rear braking force distribution at the time of a rear wheel braking operation.

SUMMARY OF THE INVENTION

In order to achieve the foregoing object, the invention provides a braking device for a motorcycle, in which front wheel braking means (for example, a brake caliper) is operated in conjunction with a braking operation on a rear wheel. The braking device is characterized by braking force distribution characteristics on the rear and front wheels being previously set for each vehicle speed. When the braking operation on the rear wheel is performed, the front wheel braking means is controlled so as to maintain braking force distribution characteristics corresponding to a vehicle speed when the operation is started.

In such a case, until the vehicle is stopped after the braking operation on the rear wheel is started, if a brake manipulated variable is constant, braking force distribution to the front wheel is maintained constant. Moreover, since the braking force distribution characteristics are set for each vehicle speed, when the rear wheel braking operation is performed from a high-speed driving state, for example, the front wheel side braking force distribution is increased to improve braking efficiency. When the rear wheel braking operation is performed at low speed, such as when passing through between vehicles, the front wheel side braking force distribution is reduced (including a front wheel distribution of zero). Thus, it is possible to realize braking without affecting a vehicle driving operation.

In the invention described above, the front wheel braking means is consistently controlled by the braking force distribution characteristics depending on the vehicle speed when the rear wheel braking operation is started. Thus, it is possible to provide an improved feeling of braking operation at the time of the rear wheel braking operation while maintaining high braking efficiency in the high-speed driving, and to satisfy different requirements depending on conditions of the braking operation such as the ensuring of operability in passing through between vehicles.

DETAILED DESCRIPTION

Next, with reference to the drawings, an embodiment of the present invention will be described.

Figure 1:
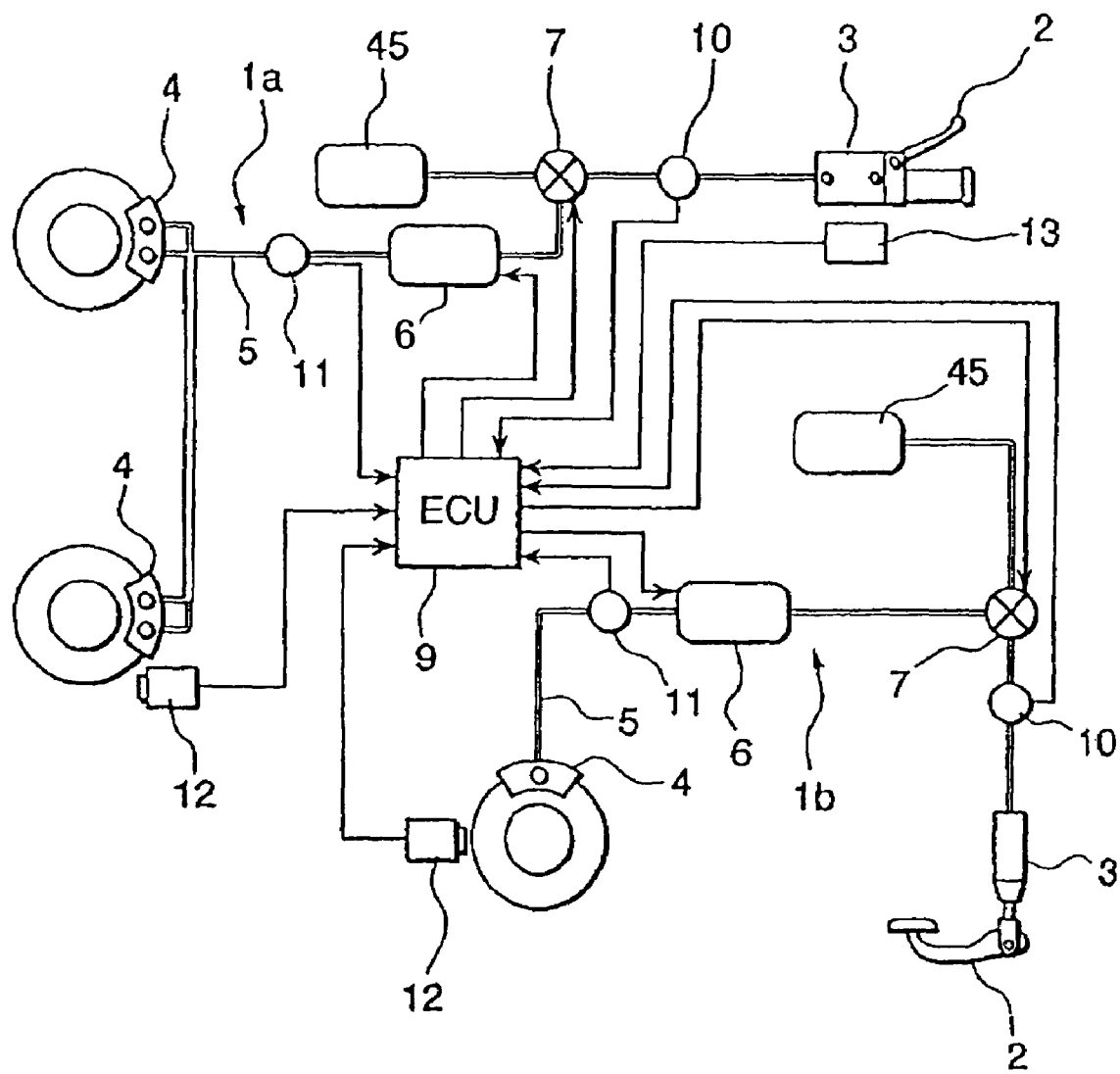
FIG. 1 is a schematic view of the combined brake system showing an embodiment of the present invention.
Figure 2:
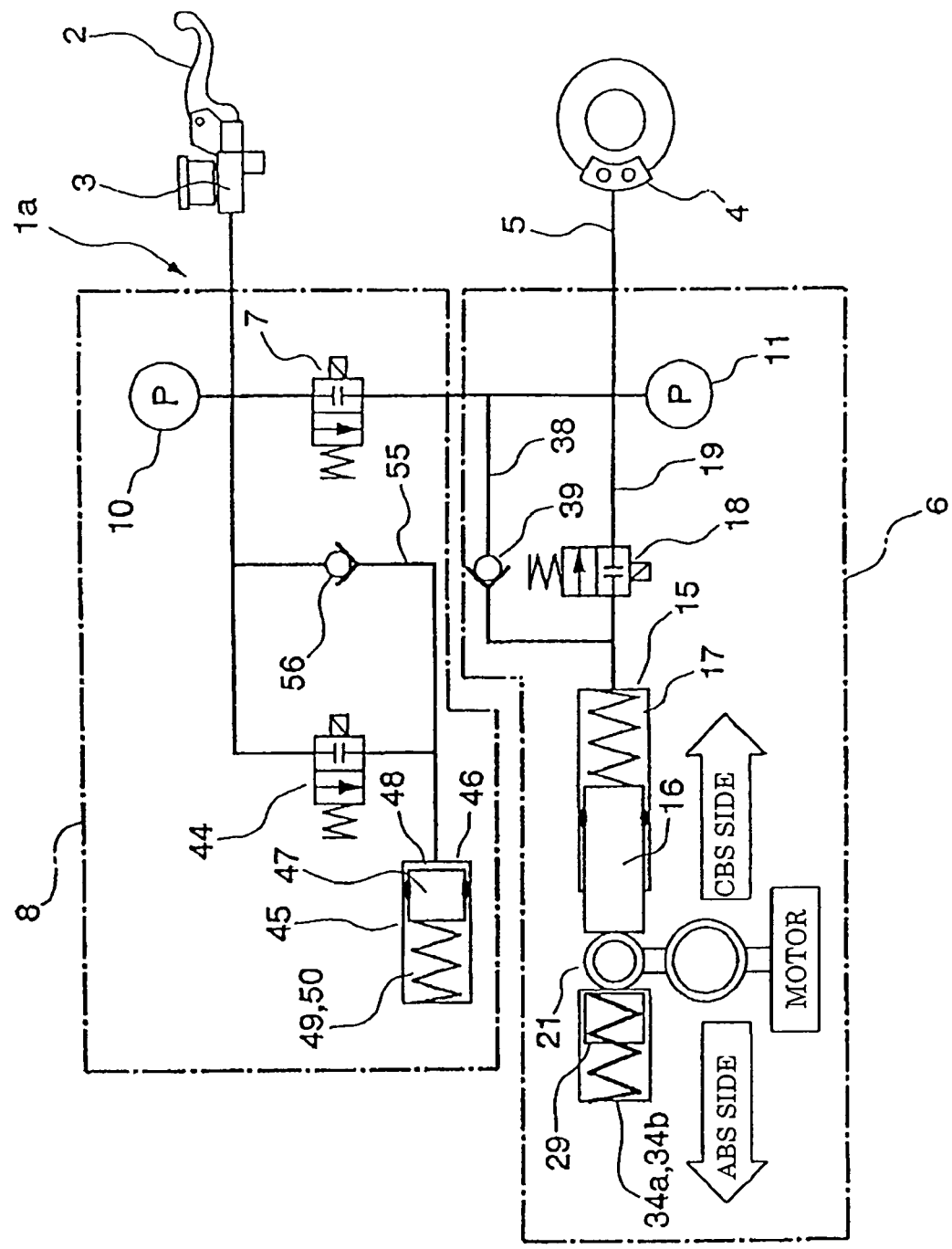
FIG. 2 is a schematic view of a braking circuit at a front wheel for the embodiment of FIG. 1.

FIG. 1 shows an entire configuration of an embodiment of a braking device according to the present invention. As shown in FIG. 1, the braking device of this embodiment includes a front wheel side brake circuit 1a and a rear wheel side brake circuit 1b, which are independent of each other. In the case of this embodiment, the brake circuits 1a and 1b on the front and rear wheels are different from each other in that a brake operating unit 2 on the front wheel is formed of a lever, and a brake operating unit 2 on the rear wheel is formed of a pedal. However, both brake circuits are approximately the same in other basic configurations. In the following concrete description of a circuit configuration, only the front wheel side brake circuit 1a will be described in detail. As to the rear wheel side brake circuit 1b, parts that are the same as those of the front wheel side brake circuit 1a are denoted by the same reference numerals and codes, and repetitive description will be omitted.

In each of the brake circuits 1a and 1b, a master cylinder 3, which is operated simultaneously with the brake operating unit 2, and a brake caliper 4, that is wheel braking means corresponding to the master cylinder, are connected to each other through a main brake passage 5. In the middle of the main brake passage 5, a hydraulic modulator 6 is combined and connected. The hydraulic modulator 6 produces a hydraulic pressure by use of an electric actuator to be described later. Moreover, in a position closer to the master cylinder 3 than a combination connection portion of the hydraulic modulator 6 on the main brake passage 5, a normally open type first electromagnetic opening and closing valve 7 is provided. The first electromagnetic opening and closing valve 7 operates connection and cutoff between the master cylinder 3 and the brake caliper 4. In addition, a reaction force modulator 45 is connected to the first electromagnetic opening and closing valve 7. The reaction force modulator 45 appropriately applyies a pseudo hydraulic reaction force depending on a brake manipulated variable (for example, the hydraulic pressure on the input side of the brake circuit) of the brake operating unit 2 to the master cylinder 3 when the valve 7 closes the main brake passage 5. Moreover, the electric actuator (motor 23) of the hydraulic modulator 6 and the first electromagnetic opening and closing valve 7 are electrically controlled by a controller (ECU) 9 together with other valves and the like which are built into the hydraulic modulator 6 and the like.

Note that, in addition to respective pressure sensors 10 and 11 and a wheel speed sensor 12, a mode selection switch 13 (mode selection means) and the like are connected to the controller 9. Specifically, the pressure sensors 10 and 11 detect hydraulic pressures on an input side (the master cylinder 3 side across the first electromagnetic opening and closing valve 7) and an output side (the brake caliper 4 side across the valve 7) of each of the brake circuits 1a and 1b. The wheel speed sensor 12 detects respective wheel speeds of the front and rear wheels. The mode selection switch 13 is manually operated by a rider to select control modes. The controller 9 controls a braking pressure of the brake caliper 4 according to these input signals and a mode switching signal.

This braking device includes a CBS capable of operating the brake caliper 4 on one of the front wheel and the rear wheel in conjunction with an operation of the brake operating unit 2 on the other of the front wheel and the rear wheel. The brake caliper 4 to be a subordinate to this CBS is operated by a pressure supplied from the hydraulic modulator 6 by use of by-wire method. Specifically, when one of the brake operating units 2 is operated, information such as speeds of the front and rear wheels and a brake manipulated variable (for example, the hydraulic pressure on the input side of the brake circuit) is inputted to the controller 9 through various sensors. In this event, the first electromagnetic opening and closing valve 7 of the other brake circuit closes the main brake passage 5 according to an instruction from the controller 9. At the same time, the hydraulic modulator 6 supplies a hydraulic pressure according to driving conditions of the vehicle and braking operations to the brake caliper 4 of the other circuit. However, supplying of the hydraulic pressure from the hydraulic modulator 6 to the circuit in which no braking operation is performed as described above is limited to when the mode selection switch 13 is set to a mode allowing the CBS, which is described later in detail.

Meanwhile, in the brake circuit in which the brake operating unit 2 is operated first, a hydraulic pressure generated in the master cylinder 3 is supplied directly to the brake caliper 4. Specifically, when the controller 9 determines through the pressure sensor 10 that one of the brake operating units 2 is operated before the other brake operating unit 2, the first electromagnetic opening and closing valve 7 is maintained as it is (normally open) in a non-energized state. As a result, the hydraulic pressure of the master cylinder 3 comes to be supplied to the brake caliper 4 through the main brake passage 5.

Therefore, the CBS of the braking device performs hydraulic control of the brake circuit to be a subordinate by by-wire. Thus, front and rear brakes can be operated in conjunction with each other at an optimum hydraulic ratio without complicating the brake caliper 4 and piping. Moreover, in the brake circuit in which the braking operation is performed first (for example, the master circuit), the hydraulic pressure of the master cylinder 3 is supplied directly to the brake caliper 4. Thus, the hydraulic modulator 6, which is a built-in electric actuator, of the brake circuit can be set in a stopped state. Accordingly, in the braking device, at least one of the hydraulic modulators 6 can be set in an inactive state at the time of braking by the CBS. Consequently, current consumption is surely suppressed.

Moreover, since the first electromagnetic opening and closing valve 7 provided in the main brake passage 5 is normally open, the valve 7 can be set in the non-energized state during normal driving of the vehicle, and the like. Therefore, also in this regard, the current consumption of the vehicle can be significantly suppressed. Note that the above description is given of the case where the braking operation is performed for a relatively short period of time. However, the braking device shifts to a mode of further suppressing the current consumption when the braking operation is performed for a long period of time, such as stopping on a slope. This current suppression mode will be described later.

Now, with reference to FIGS. 2 to 10, the structure and function of the hydraulic modulator 6 will be described.

Figure 3:
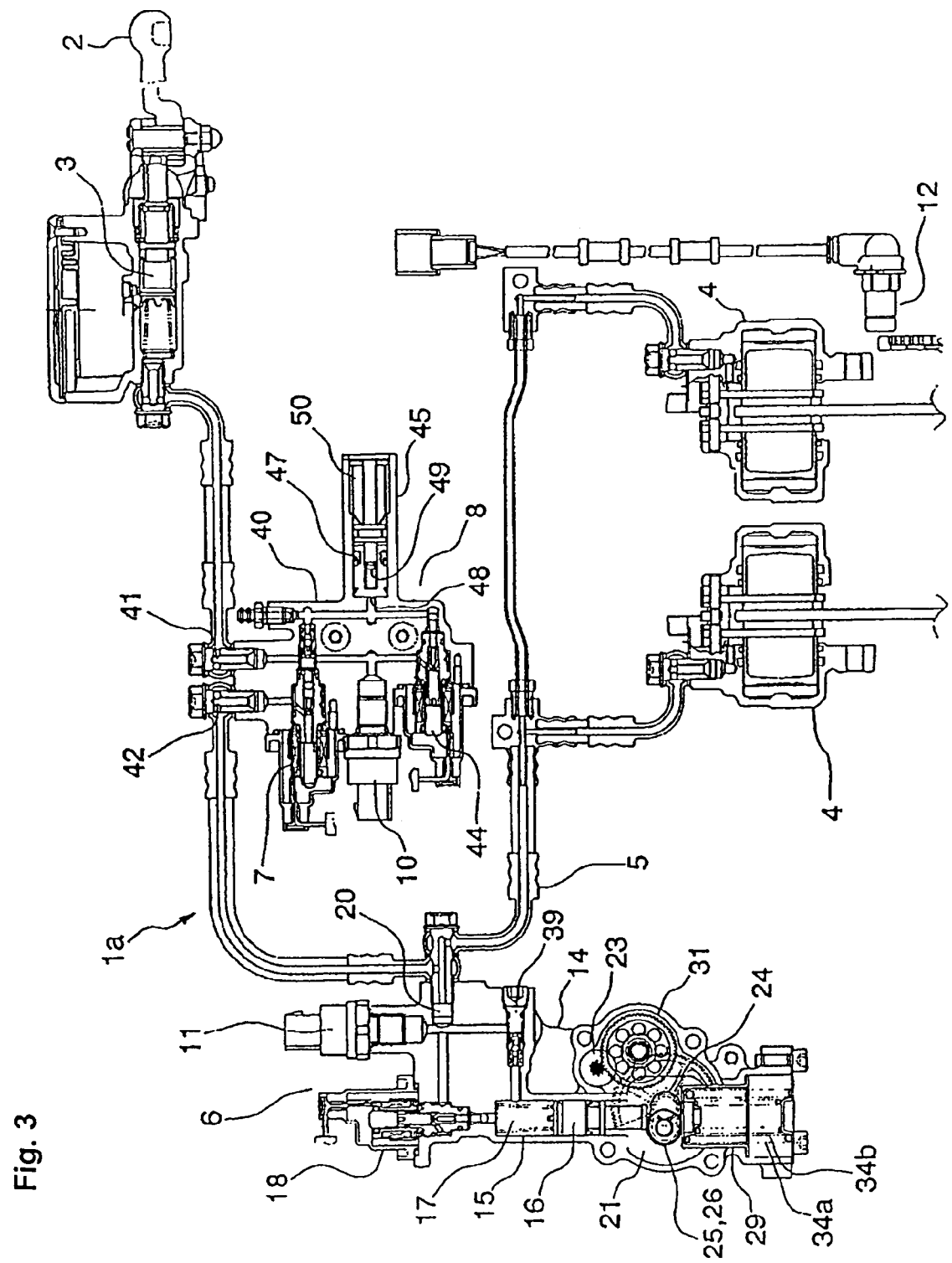
FIG. 3 is a diagram of a braking circuit at a front wheel for the embodiment of FIG. 1 showing hydraulic fluid pathways between braking system components.
Figure 4:
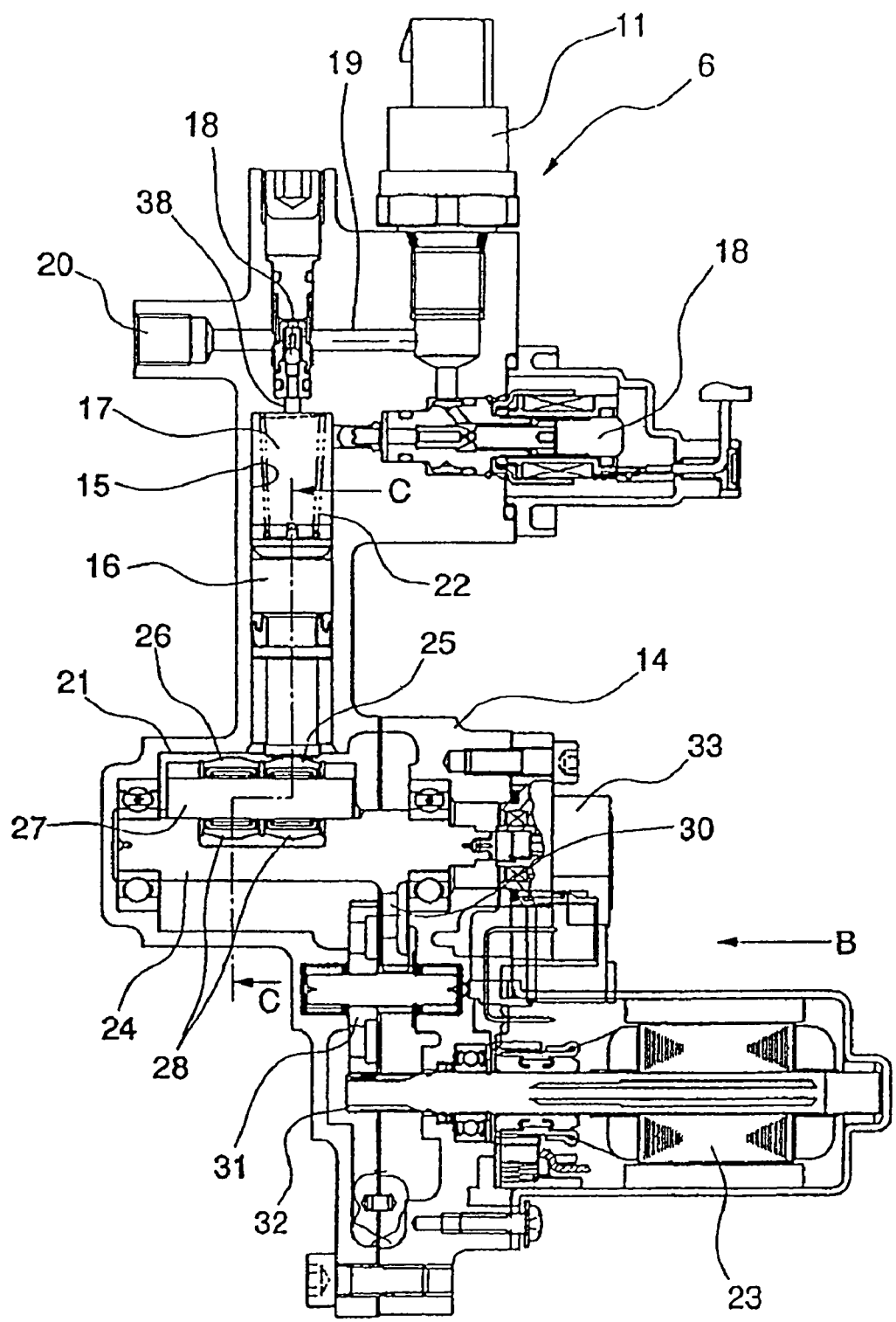
FIG. 4 is an enlarged sectional view of the hydraulic pressure modulator taken along the dashed line A—A in FIG. 5 showing the piston in a neutral position within the hydraulic pressure chamber.
Figure 5:
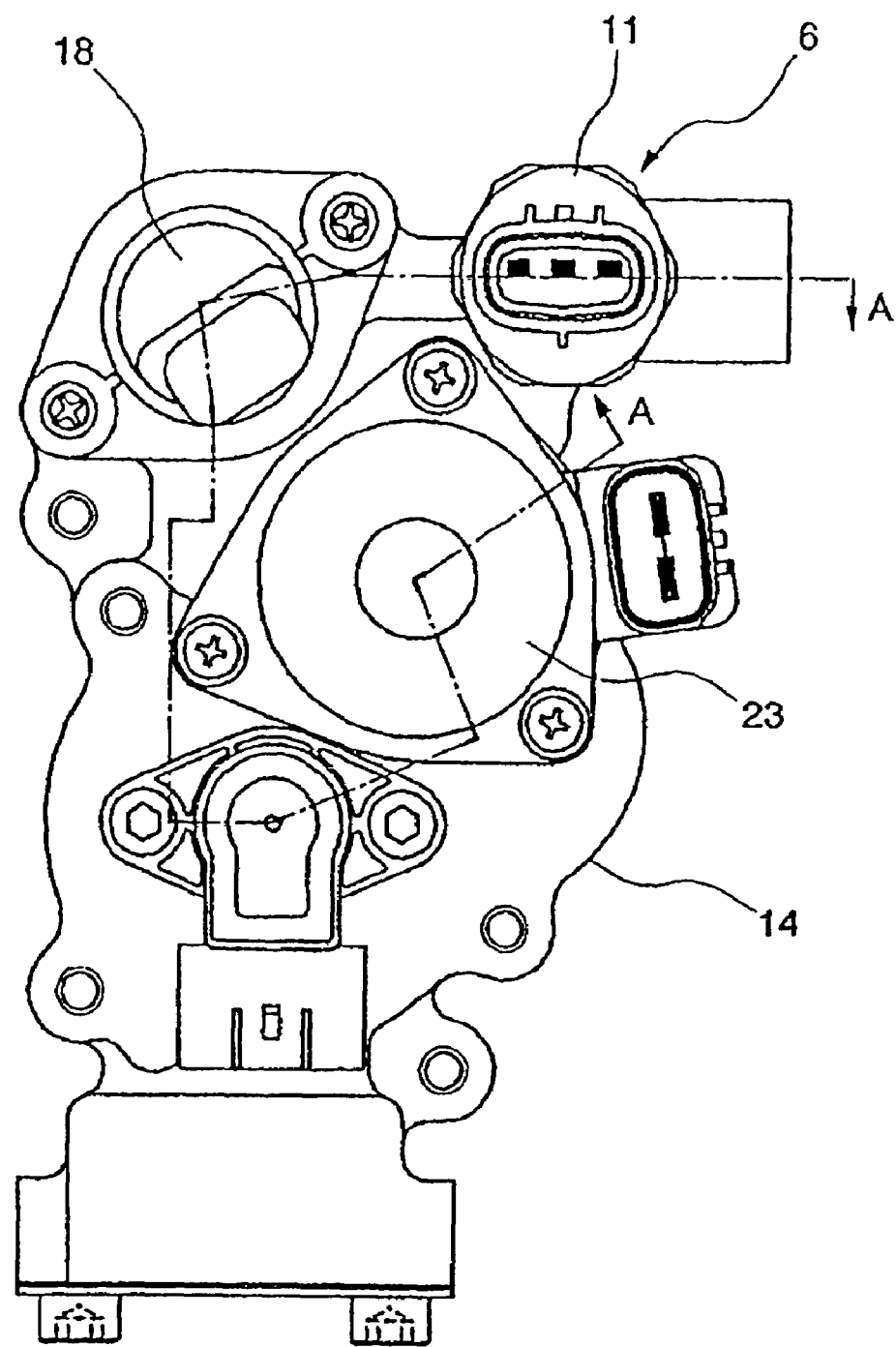
FIG. 5 is a side view of the hydraulic pressure modulator as is seen from the direction of the arrow B in FIG. 4 showing the second electromagnetic on-off valve, the pressure sensor, and the motor lying in parallel.
Figure 9:
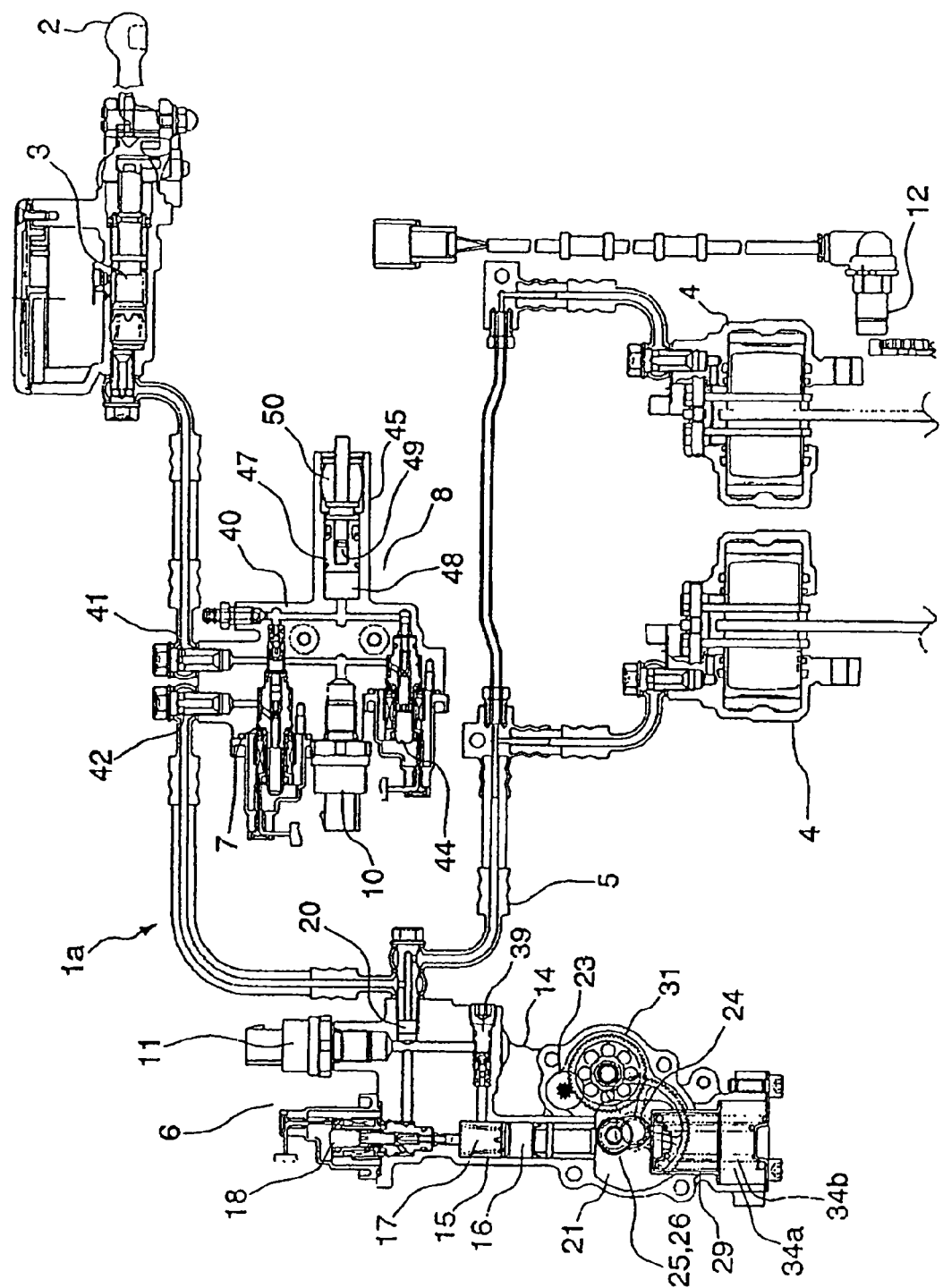
FIG. 9 is a diagram of a braking circuit at a front wheel for the embodiment of FIG. 1 showing hydraulic fluid pathways between braking system components for the braking system in a CBS operation.
Figure 10:
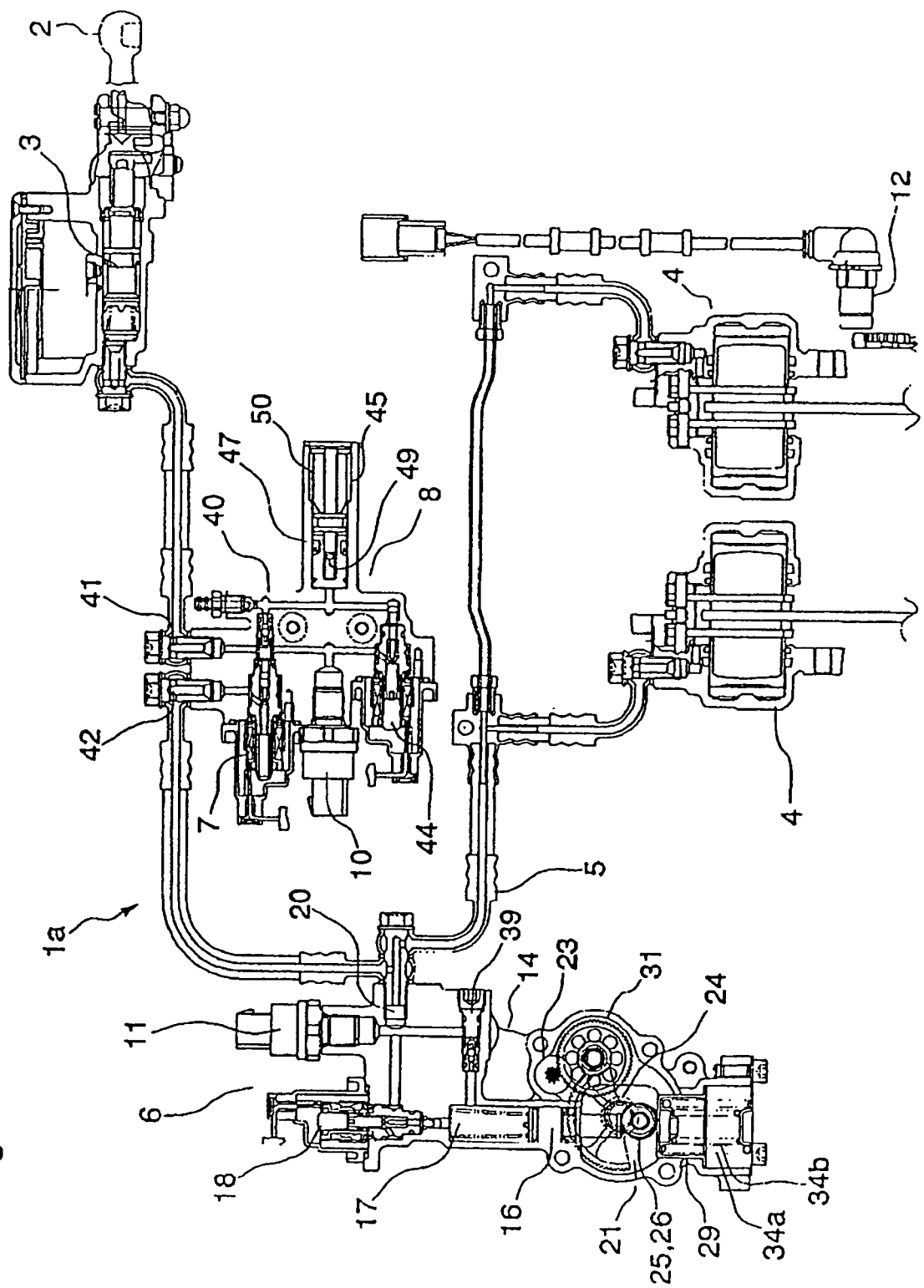
FIG. 10 is a diagram of a braking circuit at a front wheel for the embodiment of FIG. 1 showing hydraulic fluid pathways between braking system components for the braking system in an ABS operation.

As shown in a developed cross-sectional view of FIG. 4, in the hydraulic modulator 6, a piston 16 is housed so as to be movable in a cylinder 15 formed in a modulator body 14, and a hydraulic chamber 17 is formed between the cylinder 15 and the piston 16. This hydraulic chamber 17 is connected to an output port 20 of the modulator body 14 through a main supply and exhaust passage 19 in which a normally closed type second electromagnetic opening and closing valve 18 is provided. This output port 20 is connected to the main brake passage 5 as shown in FIGS. 3, 9 and 10. Accordingly, between the hydraulic chamber 17 and the main brake passage 5, a hydraulic fluid is appropriately supplied and discharged. Note that the hydraulic modulator 6 shown in FIG. 4 and the hydraulic modulator 6 shown in FIGS. 3, 9 and 10 are drawn to be different from each other with respect to an internal passage from the hydraulic chamber 17 to the main brake passage 5. However, this is a difference for convenience of graphic representation, and actual structure and function do not vary.

Moreover, the hydraulic modulator 6 includes: a cam mechanism 21 which pushes up the piston 16 in the direction of the hydraulic chamber 17 as shown in FIG. 4; a return spring 22 which constantly presses the piston 16 against the cam mechanism 21 side; and an electric motor 23 as an electric actuator operating the cam mechanism 21. This electric motor 23 is subjected to rotation control accordingly in forward and backward directions by the controller 9 (see FIG. 1).

In the cam mechanism 21, a pair of cam rollers 25 and 26 are provided in a camshaft 24 which is axially supported in the modulator body 14, the rollers being provided so as to be eccentric from a rotation center of the camshaft 24. The both cam rollers 25 and 26 are supported so as to be rotatable, by means of a needle roller bearing 28, on a common shaft 27 provided parallel to the axis of the camshaft 24 in its peripheral portion. Therefore, the both cam rollers 25 and 26 are disposed in the peripheral portion of the camshaft 24 so as to be arranged in series with the axial direction. An end of the piston 16 is urged by the return spring 22 to constantly abut the cam roller 25, and a lifter 29 to be described later abuts the other cam roller 26.

Figure 6A:
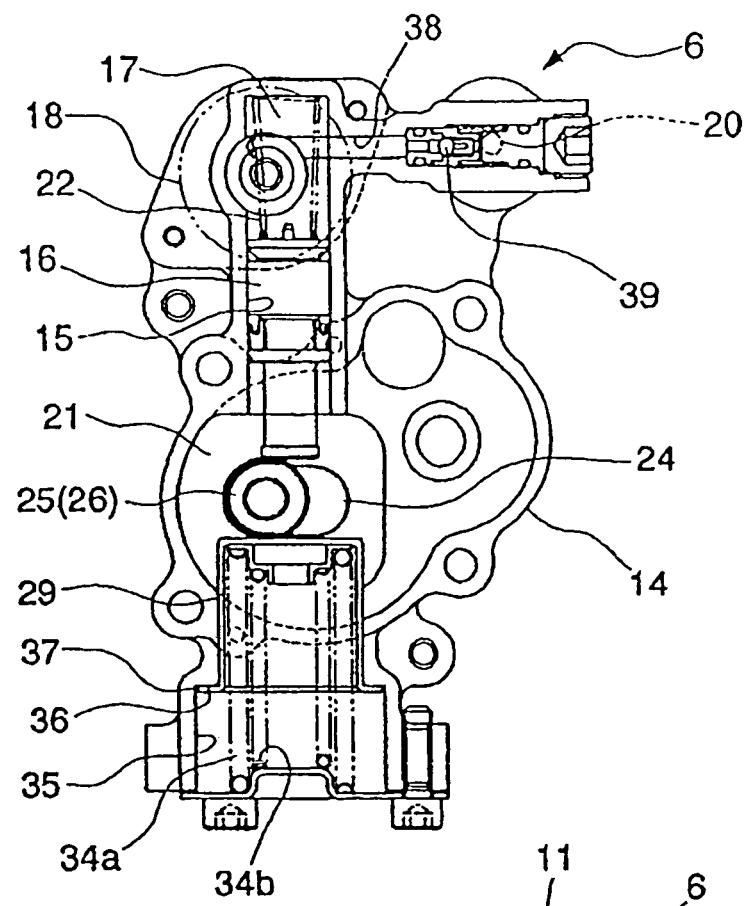
FIG. 6(a) is a sectional view of the hydraulic pressure modulator taken along the dashed line C—C in FIG. 4, which is not in operation, showing the piston in the neutral position.
Figure 6B:
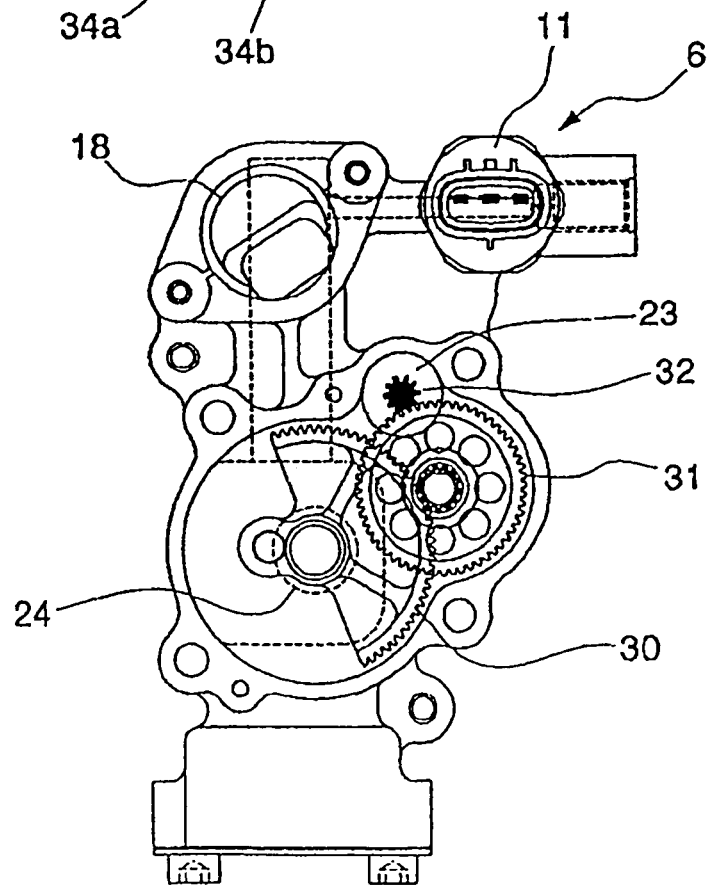
FIG. 6(b) is a side view of the hydraulic pressure modulator of FIG. 6(a) as seen from the direction of the arrow B in FIG. 4, showing a transmission part of an electrically-operated motor.

Moreover, a sector gear 30 is integrally provided in one end of the camshaft 24, and this sector gear 30 portion is coupled to a pinion gear 32 on an output shaft of the electric motor 23 through a reduction gear 31 (see FIGS. 4 and 6(*b*)). Therefore, running torque of the electric motor 23 is transmitted to the camshaft 24 by engagement of these gears, and rotation of the camshaft 24 by the torque is transmitted, as control force, to the piston 16 through the cam roller 25. Moreover, an angle sensor 33 is further provided in one end of the camshaft 24, and angle information of the camshaft 24, which is detected by the angle sensor 33, is set to be fed back to the controller 9.

The piston 16 is subjected to operation control in one end region and the other end region in the cylinder 15 by using an approximately center position in the cylinder 15 as a neutral reference position. FIGS. 3, 4, 6(*a*) and 6(*b*) show a state where the piston 16 is in the neutral reference position. In this state, an eccentric position of the cam roller 25 on the camshaft 24 is approximately orthogonal to a stroke direction of the piston 16. The electric motor 23, by executing energization control, accordingly performs a rotation operation of the eccentric position of the cam roller 25 in a vertical direction in the drawings.

In the hydraulic modulator 6 of this embodiment, a region in which the hydraulic chamber 17 is expanded (for example, the piston moves downward in FIG. 4) with respect to the neutral reference position is set to be used for ABS control, and conversely, a region in which the hydraulic chamber 17 is contracted (for example, the piston moves upward in FIG. 4) is set to be used for CBS control.

The ABS is intended to perform hydraulic control starting from pressure reduction with respect to the main brake passage 5 (the brake caliper 4), to retention and reboosting. Thus, use of the region in which the hydraulic chamber 17 is expanded by operating the piston from the neutral reference position is suitable for the ABS control. Note that FIGS. 8(*a*), 8(*b*) and 10 show a state of the ABS control.

Moreover, the CBS is started by actively supplying the hydraulic fluid to the main brake passage (the brake caliper 4). Thus, use of the region in which the hydraulic chamber 17 is contracted by operating the piston upward from the neutral reference position is suitable for the control. Note that FIGS. 7(*a*), 7(*b*) and 9 show a state of the CBS control.

Therefore, in the case of this hydraulic modulator 6, the approximately center position of the cylinder 15 is used as the neutral reference position, and the piston 16 is operated by using the ABS and CBS in both regions, respectively. Thus, the necessity to individually provide dedicated pistons for the ABS and the CBS is eliminated. Consequently, a reduction in the number of parts in this hydraulic modulator 6 and reduction in size and weight of the modulator itself are possible.

Figure 7A:
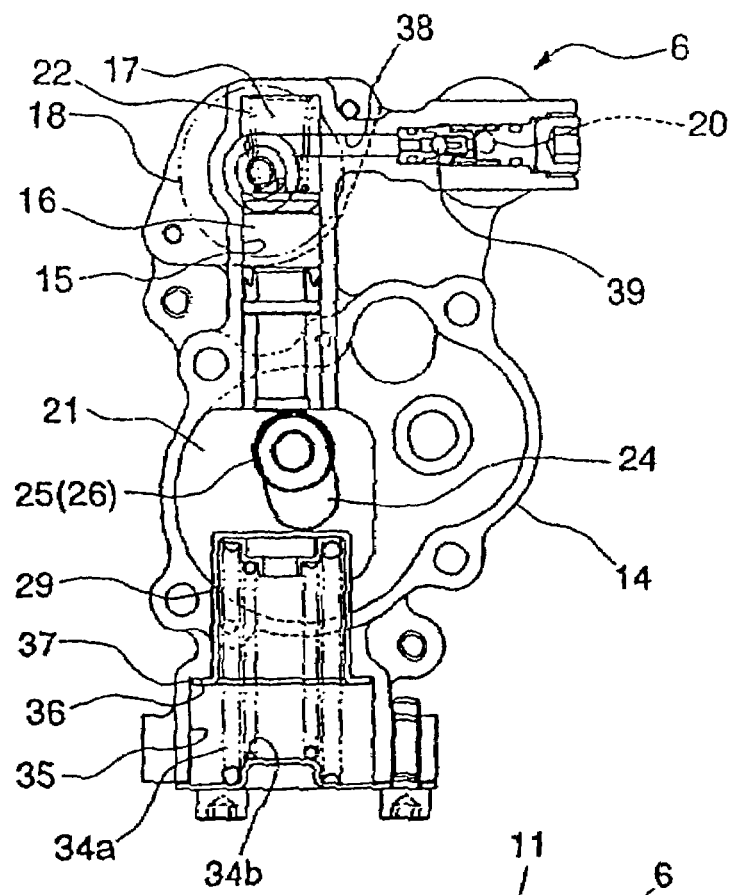
FIG. 7(a) is a sectional view of the hydraulic pressure modulator taken along the dashed line C—C in FIG. 4, showing the hydraulic pressure chamber reduced in sized due to the upward movement of the piston as found when the braking system is under CBS control.
Figure 7B:
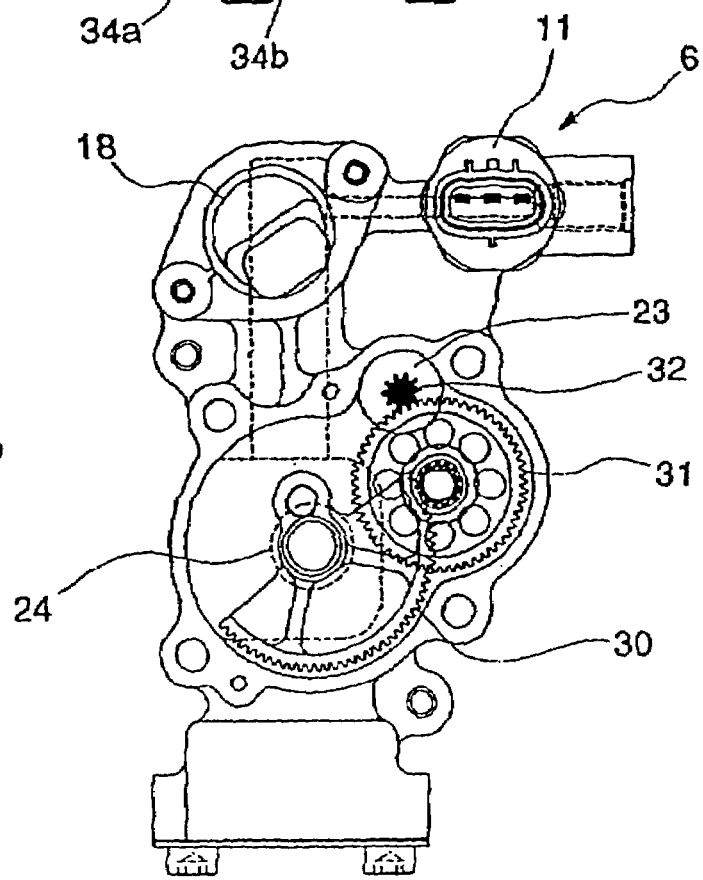
FIG. 7(b) is a side view of the hydraulic pressure modulator of FIG. 7(a) as seen from the direction of the arrow B in FIG. 4, showing a transmission part of an electrically-operated motor.
Figure 8A:
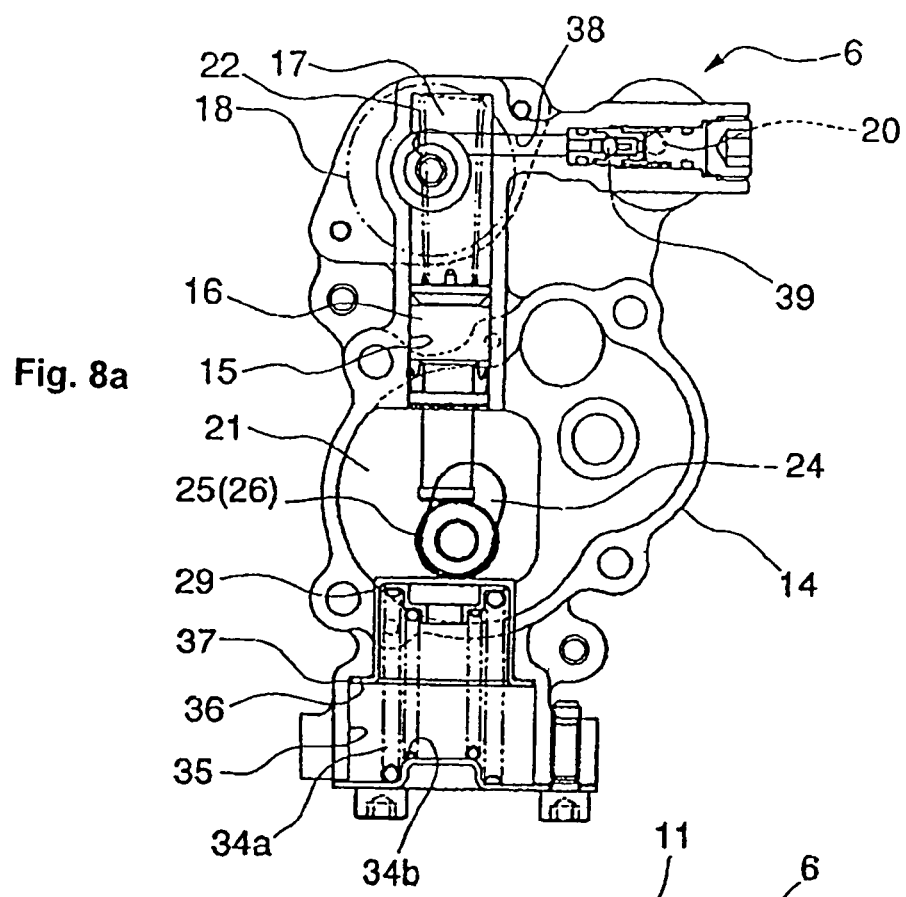
FIG. 8(a) is a sectional view of the hydraulic pressure modulator taken along the dashed line C—C in FIG. 4, showing the hydraulic pressure chamber expanded in sized due to the downward movement of the piston as found when the braking system is under ABS control.
Figure 8B:
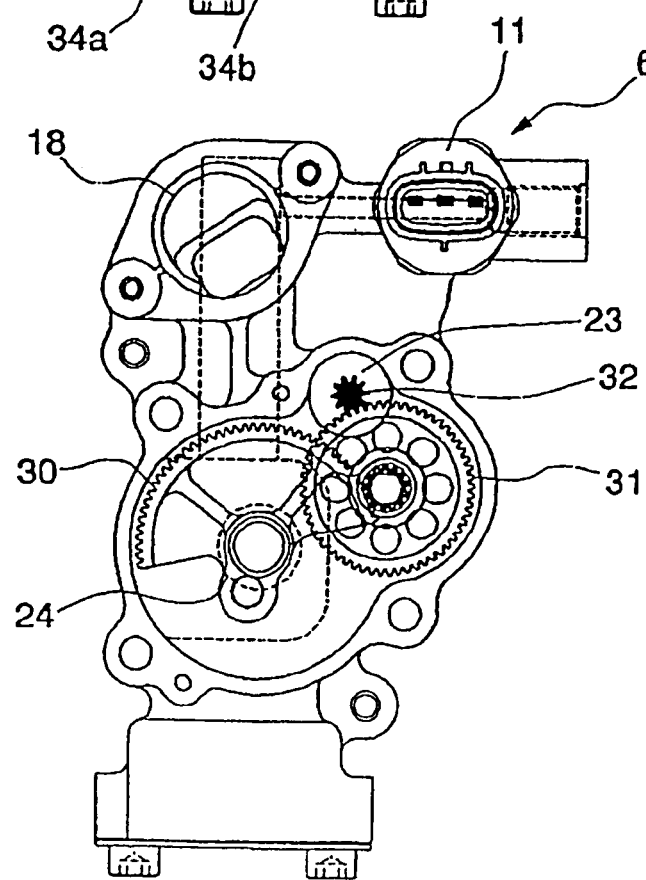
FIG. 8(b) is a side view of the hydraulic pressure modulator of FIG. 8(a) as seen from the direction of the arrow B in FIG. 4, showing a transmission part of an electrically-operated motor.

Moreover, in the position below the other cam roller 26 of the hydraulic modulator 6, as shown in FIGS. 6 to 8, the above-described cylindrical lifter 29 has a bottom and is disposed so as to be movable. The lifter 29 is urged in the direction of the cam roller 26 by a pair of backup springs 34*a* and 34*b* (energizing means) which are disposed to have a nested structure. The lifter 29 is disposed in a step-like holding hole 35 in the modulator body 14. A stopper flange 37 is integrally formed on an opening rim of the lifter 29.

Stopper flange 37 can abut on a step surface 36 of the holding hole 35. This stopper flange 37, together with the step surface of the holding hole 35, forms a stopper which controls an energized position of the piston 16 as urged by the backup springs 34a and 34b. This stopper (the stopper flange 37 and the step surface 36) controls a maximum energizing position of the piston 16 by the backup springs 34a and 34b to be set to the aforementioned neutral reference position.

The backup springs 34a and 34b urge the piston 16 in a direction of contracting the hydraulic chamber 17. This energizing force to the piston 16 is mainly exerted when the electric motor 23 comes to be in a non-energized state. In a situation where there is no action of the torque of the electric motor 23, the position of the piston is returned to the neutral reference position where the above-described stopper operates. Note that the relative spring reaction force of the backup springs 34a and 34b and the return spring 22 is set to be larger on the side of the backup springs 34a and 34b when the piston 16 is in the neutral reference position. Spring reaction force in a direction of returning the position of the piston to the neutral reference position is set to act on the piston 16 constantly from the springs 34a, 34b and 22 on the both sides.

Moreover, as shown in FIG. 4, in the modulator body 14, a bypass passage 38 is provided, which connects the hydraulic chamber 17 to the output port 20 while bypassing the second electromagnetic opening and closing valve 18. In this bypass passage 38, a check valve 39 is provided, which allows the hydraulic fluid to flow in the direction from the hydraulic chamber 17 to the output port 20.

The second electromagnetic opening and closing valve 18 in the main supply and exhaust passage 19 is normally closed type, and is opened by energization only when the ABS control is performed and when the hydraulic fluid is supplied to the brake caliper 4 from the hydraulic modulator 6 by the CBS control. However, even under such control situations, once the second electromagnetic opening and closing valve 18 is set to a non-energized state due to some reason, the supply and exhaust passage 19 is automatically closed. In this braking device, even in such a situation where the second electromagnetic opening and closing valve 18 is closed, the flow of the hydraulic fluid in the direction from the hydraulic chamber 17 to the main brake passage 5 is secured by the bypass passage 38 and the check valve 39.

Moreover, in the case of this braking device, the pressure sensor 11, which detects the hydraulic pressure on the output side of each brake circuit, is assembled in the modulator body 14 of the hydraulic modulator 6. A sensor detection unit is disposed so as to face an upstream position (the output port 20 side position) of the second electromagnetic opening and closing valve 18 on the supply and exhaust passage 19 in the modulator body 14. Therefore, in this braking device, compact arrangement of the pressure sensor 11 and the hydraulic modulator 6 as an integral block can be achieved, and the hydraulic pressure on the output side of the brake circuit can be detected in a region adjacent to the brake caliper 4.

Moreover, in the case of the hydraulic modulator of this embodiment, as shown in FIGS. 5 to 8, the pressure sensor 11, the electric motor 23, and the second electromagnetic opening and closing valve 18, which are functional parts having long axes, are assembled in the modulator body 14 so as to be parallel to each other. Thus, the entire hydraulic modulator 6 is made compact, which is very advantageous in mounting the modulator on the vehicle.

Figure 11:
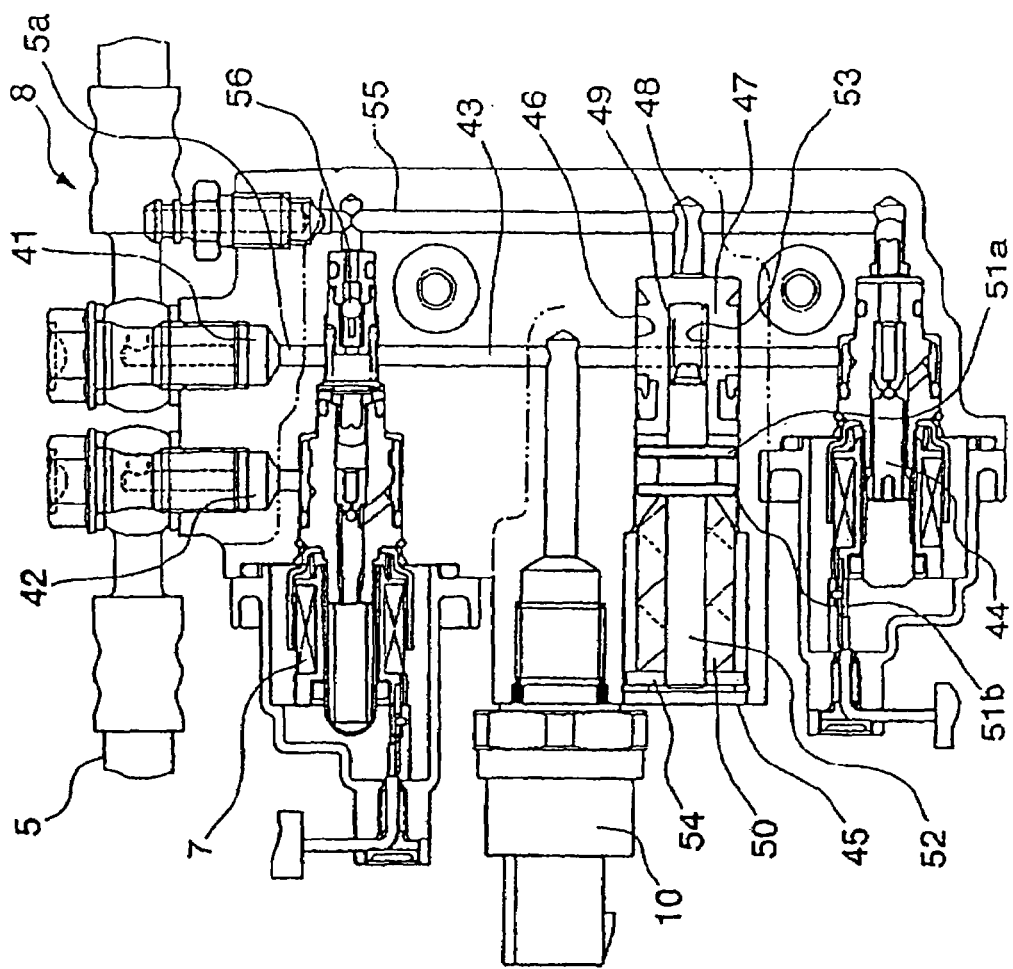
FIG. 11 is a sectional view of a reaction force modulator of the embodiment of FIG. 1.
Figure 12:
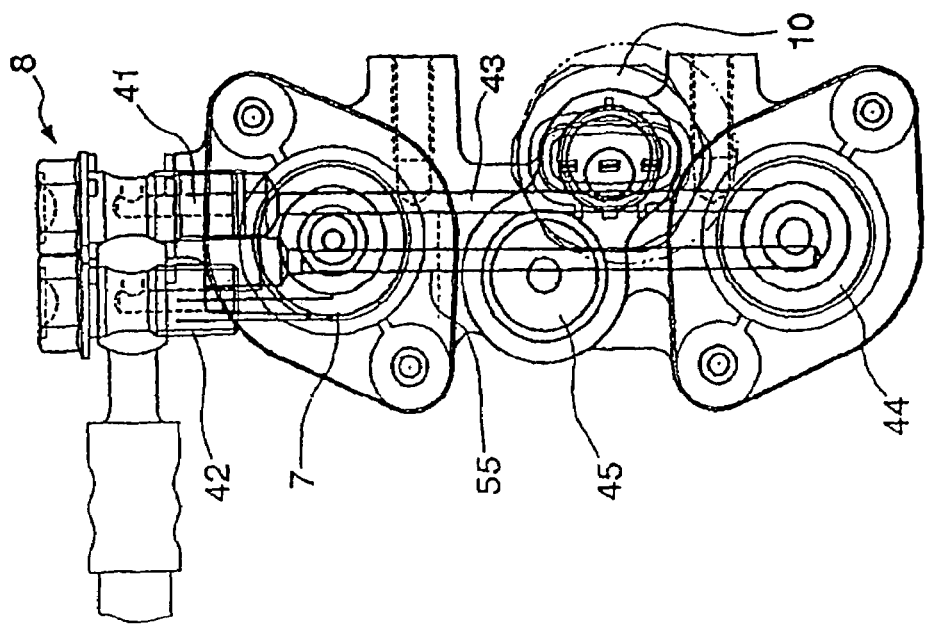
FIG. 12 is a passage arrangement view for the reaction force modulator of FIG. 11 as seen from the direction perpendicular to the section in FIG. 11.

Next, with reference to FIGS. 11 and 12, the specific structure of the reaction force modulator 45 portion will be described. Note that, in the structure shown in FIGS. 11 and 12, directions of constituent components and the like are different from those shown in FIGS. 3, 9 and 10. This is for convenience of graphic representation.

The reaction force modulator 45 is fitted in a passage switching unit 8 having a shape of an integral block. In a unit body 40 of this passage switching unit 8, a main brake forming path 5a, which constitutes part of the main brake passage 5, is formed. One end of this main brake forming path 5a is used as an inlet port 41 which communicates with the master cylinder 3 side. The other end of this main brake forming path 5a is used as an outlet port 42 which communicates with the brake caliper 4 side. Moreover, the aforementioned first electromagnetic opening and closing valve 7 is integrally assembled in the unit body 40, and an open/close operating unit of the first electromagnetic opening and closing valve 7 is set to open and close the main brake forming path 5a.

In an upstream position of the first electromagnetic opening and closing valve 7 (the master cylinder 3 side position) in the main brake forming path 5a, a branch passage 43 is provided. The reaction force modulator 45 is connected to this branch passage 43 through a normally closed third electromagnetic opening and closing valve 44. The third electromagnetic opening and closing valve 44 is subjected to the energization control by the controller 9, as in the case of the first electromagnetic opening and closing valve 7. When the CBS control is performed, the third electromagnetic opening and closing valve 44 allows the master cylinder 3 side and the reaction force modulator 45 to communicate with each other in the brake circuit to be the subordinate side. Note that, in this event, the first electromagnetic opening and closing valve 7 closes the main brake forming path 5a by energization.

Moreover, on an upstream of the third electromagnetic opening and closing valve 44 (the inlet port 41 side) in the branch passage 43, the pressure sensor 10 is provided on the input side of the brake circuit. This pressure sensor 10 is integrally assembled in the unit body 40, and is disposed so as to allow its pressure detection portion to face inside of the branch passage. The upstream portion of the third electromagnetic opening and closing valve 44 in the branch passage 43 is constantly connected to the inlet port 41 regardless of opening and closing of the first electromagnetic opening and closing valve 7. Thus, the pressure sensor 10 can constantly and accurately detect a pressure in the vicinity of the master cylinder 3 in the circuit.

Meanwhile, in the reaction force modulator 45, a piston 47 is housed so as to be movable in a cylinder 46 formed in the unit body 40. Between the cylinder 46 and the piston 47, a fluid chamber 48 is formed, which receives the hydraulic fluid directed in from the master cylinder 3 side. On a back side of the piston 47, a metal coil spring 49 and an irregular-shaped resin spring 50 are arranged in series. By use of the two springs 49 and 50 (elastic members) which have different properties, reaction force is set to be applied to the piston 47.

Moreover, on the back side of the piston 47 in the cylinder 46, a guide rod 52 is disposed. The guide rod 52 has a pair of flanges 51a and 51b formed thereon which are positioned approximately in the center of rod in the axial direction. One end of this guide rod 52 is inserted into a holding hole 53 formed in the center of the back of the piston 47, and the other end thereof penetrates a center portion of the axis of the irregular-shaped resin spring 50. The coil spring 49 is disposed between the holding hole 53 of the piston 47 and the one end of the guide rod 52. The coil spring 49 is generates a spring reaction force by a stroke until the back of the piston 47 abuts on the flange 51a of the guide rod 52. Meanwhile, the irregular-shaped resin spring 50 is disposed between a thrust washer 54 disposed on a bottom of the cylinder 46 and the other flange 51b of the guide rod 52. The irregular-shaped resin spring 50 is set to change its shape by a backward stroke of the guide rod 52, and, in this event, to generate reaction force and damping resistance (internal frictional resistance) caused by the change in shape. Note that the shape and material of the irregular-shaped resin spring 50 are determined according to target characteristics.

Here, with respect to relative spring constants of the coil spring 49 and the irregular-shaped resin spring 50, on the whole, a larger spring constant is set for the irregular-shaped resin spring 50. Accordingly, when the piston 16 performs the backward stroke, the coil spring 49 starts to deform first. Moreover, the coil spring 49, made of metal material, has linear spring characteristics, and the irregular-shaped resin spring 50 has hysteresis characteristics (damping characteristics). Thus, in this reaction force modulator 45, in an early stage of backward movement of the piston 16, reaction force characteristics by the coil spring 49 are mainly obtained having a slow rise. On the other hand, in a later stage of the backward movement, characteristics are obtained by the irregular-shaped resin spring 50 having a sudden rise of reaction force and damping characteristics.

In the case of this braking device, when the CBS control is performed, the hydraulic fluid is introduced into the reaction force modulator 45 from the master cylinder 3 in the brake circuit which is operated with a delay. In this event, multistage reaction forces are generated by the two kinds of springs 49 and 50 as described above in the reaction force modulator 45. Thus, despite its extremely simple structure, the braking device can obtain a feeling of a smooth braking operation which is the same as that obtained by a braking device of a direct operation type.

Moreover, a bypass passage 55 is provided in the unit body 40 of the reaction force modulator 45 which connects the reaction force modulator 45 to the upstream region of the first electromagnetic opening and closing valve 7 in the main brake forming path 5a, while bypassing the third electromagnetic opening and closing valve 44. In this bypass passage 55, a check valve 56 is provided. The check valve 56 allows the hydraulic fluid to flow in the direction from the reaction force modulator 45 side to the inlet port 41 side (in the direction of the master cylinder 3). Therefore, even if the CBS control is released in the state where the hydraulic fluid is introduced into the reaction force modulator 45, the hydraulic fluid in the reaction force modulator 45 is surely returned to the master cylinder 3 side through the bypass passage 55. Thus, since the piston 47 in the reaction force modulator 45 is surely returned to its initial position, the same feeling of braking operation can be obtained when the next CBS control is started.

Moreover, in this embodiment, the first electromagnetic opening and closing valve 7, which opens and closes the main brake passage 5, and the reaction force modulator 45 are integrally assembled in the passage switching unit 8. Thus, the both parts can be made compact as an integral block. Furthermore, in this embodiment, not only the first electromagnetic opening and closing valve 7 but also the pressure sensor 10 on the input side and the third electromagnetic opening and closing valve 44 are integrated in the same unit 8. Thus, density of the functional parts is increased, which is very advantageous in mounting these functional parts on the vehicle.

Furthermore, in the aforementioned passage switching unit 8, the first and third electromagnetic opening and closing valves 7 and 44 and the pressure sensor 10, all of which are functional parts having long axes, are all assembled in the unit body 40 so as to be parallel to the reaction force modulator 45. This is advantageous in making the passage switching unit 8 itself compact.

Moreover, in the passage switching unit 8, the first and third electromagnetic opening and closing valves 7 and 44 are disposed by shifting positions thereof in the axial direction. A passage linking the inlet port 41 to the third electromagnetic opening and closing valve 44 (part of the main brake forming path 5a and part of the branch passage 43) is linearly formed. Thus, there is an advantage of the processing of the passages being facilitated.

Based on the above description of the constituent components, operations of the entire braking device will now be described. Note that in this description, the mode selection switch 13 is considered to be set to a mode allowing the CBS.

In the case where the brake operating unit 2 on one of the front and the rear wheel is operated first by the rider when the vehicle is traveling, in the brake circuit which is operated first, all of the first to second electromagnetic opening and closing valves 7, 44 and 18 remain in a non-energized state, and the hydraulic pressure generated in the master cylinder 3 is directly supplied to the brake caliper 4.

Meanwhile, in this event, in the brake circuit which is operated later, all of the first to second electromagnetic opening and closing valves 7, 44 and 18 are energized, and the main brake passage 5 is cut off from the master cylinder 3 by the first electromagnetic opening and closing valve 7. At the same time, the master cylinder 3 and the reaction force modulator 45 are connected to each other by an opening operation of the third electromagnetic opening and closing valve 44. Furthermore, the hydraulic modulator 6 and the main brake passage 5 are connected to each other by an opening operation of the second electromagnetic opening and closing valve 18. Thus, the rider is provided with a feeling of braking operation which is artificially reproduced by the reaction force modulator 45. At the same time, hydraulic pressure fluctuations due to the operation of the hydraulic modulator 6 are not transmitted to the rider side. Moreover, in this event, the electric motor 23 of the hydraulic modulator 6 is operated in parallel to this event, and the cam roller 25 pushes up the piston 16 to pressurize the hydraulic fluid in the hydraulic chamber 17. Thus, a hydraulic pressure by control of the electric motor 23 is supplied to the brake caliper 4 through the main brake passage 5.

Note that, in this event, the hydraulic pressure supplied to the brake caliper 4 from the hydraulic modulator 6 is controlled so as to offer hydraulic pressures of the front and rear brakes at a previously set distribution ratio. Moreover, in such CBS control, when it is detected that the wheel having the modulator operated is almost locked, the electric motor 23 is controlled by the controller 9 to allow the piston 16 to move backward, and to lower the braking pressure of the brake caliper 4. Thus, locking of the wheel is avoided.

Moreover, when it is detected that the wheel is almost locked in the brake circuit in which the braking operation is performed first, the controller 9 operates the first electromagnetic opening and closing valve 7 to cut off the connection between the master cylinder 3 and the brake caliper 4. At the same time, the controller 9 operates the second electromagnetic opening and closing valve 18 to connect the hydraulic modulator 6 to the main brake passage 5. Moreover, the controller 9 controls the electric motor 23 to allow the piston 16 to move backward from the neutral reference position, and starts the ABS control. Thus, the braking pressure of the brake caliper 4 is reduced, and the locking of the wheel is avoided. Note that, in this event, the third electromagnetic opening and closing valve 44 in the passage switching unit 8 is closed, and the connection between the master cylinder 3 and the reaction force modulator 45 is cut off.

Incidentally, when the ABS control is started as described above, and the piston 16 in the hydraulic modulator 6 moves backward, the backup springs 34a and 34b are compressed through the lifter 29 by eccentric rotation of the cam roller 25 on the camshaft 24. In a normal ABS operation, an operation of lifting the piston 16 from this state is basically performed by the power of the electric motor 23. When the electric motor 23 is set to a non-energized state due to some reasons during the ABS control, the piston 16 is returned to the neutral reference position by the force of the backup springs 34a and 34b, and the hydraulic fluid evacuated in the hydraulic chamber 17 is returned to the main brake passage 5. Moreover, in this event, if the second electromagnetic opening and closing valve 18 is simultaneously set to the non-energized state, the main supply and exhaust passage 19 in the hydraulic modulator 6 is closed. However, in this event, the hydraulic fluid in the hydraulic chamber 17 is returned to the main brake passage 5 through the bypass passage 38 and the check valve 39.

Moreover, when the vehicle is stopped by the series of braking operations, the hydraulic pressure of the master cylinder 3, which is inputted by the rider, acts on one of the wheels, and the hydraulic pressure by the hydraulic modulator 6 acts on the other wheel. After a certain period of time has passed since the vehicle was stopped, the mode is shifted to the aforementioned current suppression mode of stopping the operation of the hydraulic modulator 6 (the electric motor 23).

In this current suppression mode, first, energization of the second electromagnetic opening and closing valve 18 of the hydraulic modulator 6 on the side where the brake caliper 4 is pressurized is stopped. Accordingly, in the state where the connection between the modulator 6 and the main brake passage 5 is cut off, the operation of the electric motor 23 is stopped. In this event, since the hydraulic pressure generated in the hydraulic modulator 6 remains in the main brake passage 5 and the brake caliper 4, the braking force is maintained by the hydraulic pressure.

Next, energization of the first and third electromagnetic opening and closing valves 7 and 44 in the passage switching unit 8 is stopped. Thus, first, the connection between the master cylinder 3 and the reaction force modulator 45 is cut off by closing the third electromagnetic opening and closing valve 44. At the same time, the master cylinder 3 is connected to the brake caliper 4 side of the main brake passage 5 by opening the first electromagnetic opening and closing valve 7. In this event, since the hydraulic pressure generated in the hydraulic modulator 6 remains in the main brake passage 5, the stroke on the master cylinder 3 side is maintained as it is.

By shifting to the current suppression mode in the order as described above, it is possible to switch to braking by the master cylinder 3 without making the rider feel uncomfortable. In addition, even if the operation of the electric motor 23 is stopped as described above, the braking force can be surely maintained. Thus, current consumption by the electric motor 23 can be reduced completely to zero. In addition, abrasion and wear of a motor brush of the electric motor 23, and the like, can be also reduced. Moreover, at the same time, current consumption in the respective electromagnetic opening and closing valves 7, 44 and 18 can be also suppressed.

Moreover, if the rider thereafter releases the braking operation, the hydraulic fluid is returned to the master cylinder 3 from the brake caliper 4 side. At the same time, the hydraulic fluid left in the reaction force modulator 45 is returned to the master cylinder 3 through the bypass passage 55 and the check valve 56. Thereafter, the controller 9 allows the piston 16 in the hydraulic modulator 6 to move backward to the neutral reference position by opening the second electromagnetic opening and closing valve 18 when the hydraulic pressure on the input side of the brake circuit becomes the atmospheric pressure, and by operating the electric motor 23 at the same time.

The basic operations of the braking device have been described above. However, conditions to start the CBS control can be also limited by the controller 9 depending on a brake manipulated variable (for example, the hydraulic pressure on the input side of the brake circuit), a vehicle speed, and the like. For example, in a region where the brake manipulated variable is small, braking of the front and rear wheels may be respectively performed only by the hydraulic pressure of the master cylinder 3 without performing the CBS control. The CBS control using the aforementioned hydraulic modulator 6 may be performed only when the brake manipulated variable is increased to some extent or more. Moreover, when the front and rear brakes are operated to a large degree at the same time, the braking of the front and rear wheels is performed only by the hydraulic pressure of the master cylinder 3 without performing the CBS control. Thus, suppression of the current consumption may be achieved.

Moreover, in the case of the braking device of this embodiment, there are prepared a plurality of kinds of control modes by the controller 9. The rider can switch to an arbitrary control mode by operating the mode selection switch 13.

For example, the following control modes are previously prepared.

(1) Sports mode: a control mode of performing the CBS control only when the braking operation of the front wheel is performed, and performing independent braking by use of the pressure of the master cylinder when the braking operation of the rear wheel is performed.
(2) Touring mode: a control mode of performing the CBS control when the braking operation of any of the front and rear wheels is performed.
(3) Conventional mode: a mode of performing independent braking by use of the pressure of the master cylinder when the braking operation of any of the front and rear wheels is performed.

In this braking device, such control modes can be appropriately switched by the rider according to environments in which the vehicle is used, driving conditions, and the like. Thus, the braking device can constantly perform braking which meets a rider's preference for braking operation.

Moreover, the previously prepared control modes may include, other than those described above: a control mode in which front and rear hydraulic distribution depending on the brake manipulated variable is fixed; and a control mode having different conditions to start the CBS control.

Incidentally, in the case of performing CBS control in which the rear wheel side is operated in conjunction with a braking operation on the front wheel side, as shown in FIG.

13(a), in this braking device, ratios of braking force distribution to the front and rear wheels when front wheel side braking force is increased (when a brake manipulated variable is increased) are different compared to when the front wheel side braking force is reduced (when the brake manipulated variable is reduced).

Specifically, when the front wheel side braking force is increased, hydraulic control is performed so as to gradually increase rear wheel side braking force up to a certain region. Thereafter, the rear wheel side braking force is temporarily maintained constant until the front wheel side braking force reaches a set value. Subsequently, when the front wheel side braking force exceeds the set value, hydraulic control is performed so as to gradually reduce the rear wheel side braking force. In such a situation where the front wheel side braking force is increased, the rear wheel side braking force is controlled as described above. Thus, braking efficiency in an early stage of braking can be improved, and the reduction of rear-wheel load in a later stage of braking can be suppressed.

Figure 13A:
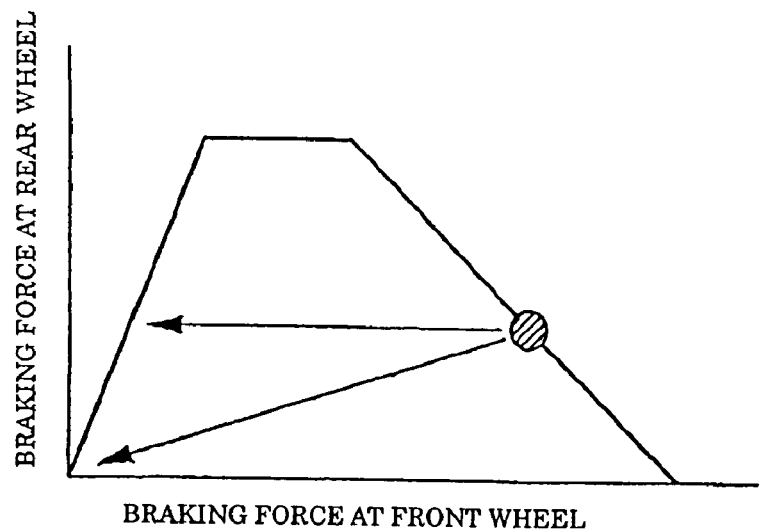
FIG. 13(a) is a braking force distribution characteristic view for front and rear wheels when a braking operation is performed to a front wheel in the embodiment of FIG. 1.
Figure 13B:
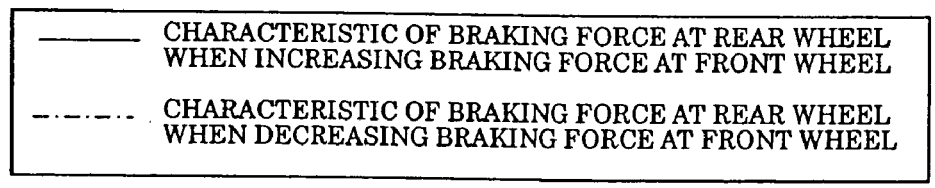
FIG. 13(b) is a braking force distribution characteristic view for front and rear wheels when a braking operation is performed to a front wheel in a prior art braking system.
Figure 13B:
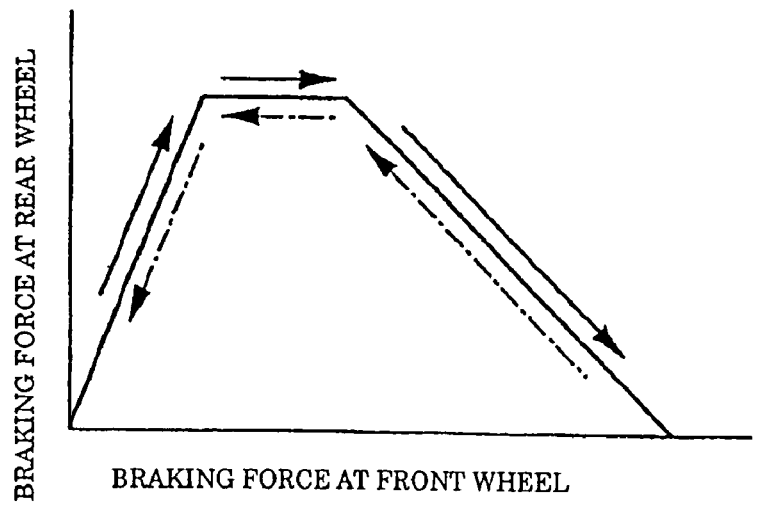

On the other hand, when the front wheel side braking force is reduced, the hydraulic control is performed so as to maintain the current rear wheel side braking force or to gradually reduce the rear wheel side braking force in response to the reduction in front wheel side braking force, once the front wheel side braking force drops to below the set value (see the arrow in FIG. 13(a)). In such a situation where the front wheel side braking force is reduced, an increase in a slip ratio of the rear wheel can be prevented by suppressing the gradual increase in the rear wheel side braking force. Moreover, the rider is provided with a feeling of a smooth braking operation.

In the case of this braking device, since the braking force on the rear wheel side is electrically controlled, the foregoing control can be quickly and accurately performed.

Moreover, the device described above is intended to control the rear wheel side braking force to be maintained or reduced when the front wheel side braking force is reduced by the rider. However, the device can also control braking time on the rear wheel side when the front wheel side braking force is reduced by the rider.

Moreover, this braking device determines the reduction of rear-wheel load as described below in the case of performing the CBS control in which the rear wheel side is operated in conjunction with the braking operation on the front wheel side. Thereafter, the braking device controls rear wheel side braking force distribution so as to suppress the reduction of the rear-wheel load.

Specifically, this braking device is set to determine the reduction of rear-wheel load based on a vehicle speed when the front wheel side braking operation is performed, a hydraulic pressure on the front wheel side, and slip ratios of the front and rear wheels. For each vehicle, depending on a wheel base of each vehicle or a position of gravitational center, and based on a relationship between the vehicle speed and the front wheel side braking force, it is possible to predict how much the rear-wheel load of the vehicle is reduced. The reduction of the rear-wheel load can be determined to some extent based on these two elements. However, in this embodiment, in order to leave out a situation where the both wheels similarly slip, a condition that a slip ratio on the front wheel side is not more than a set value $\lambda a$ and a slip ratio on the rear wheel side is not less than another set value $\lambda b$ is added to determination conditions.

Figure 14:
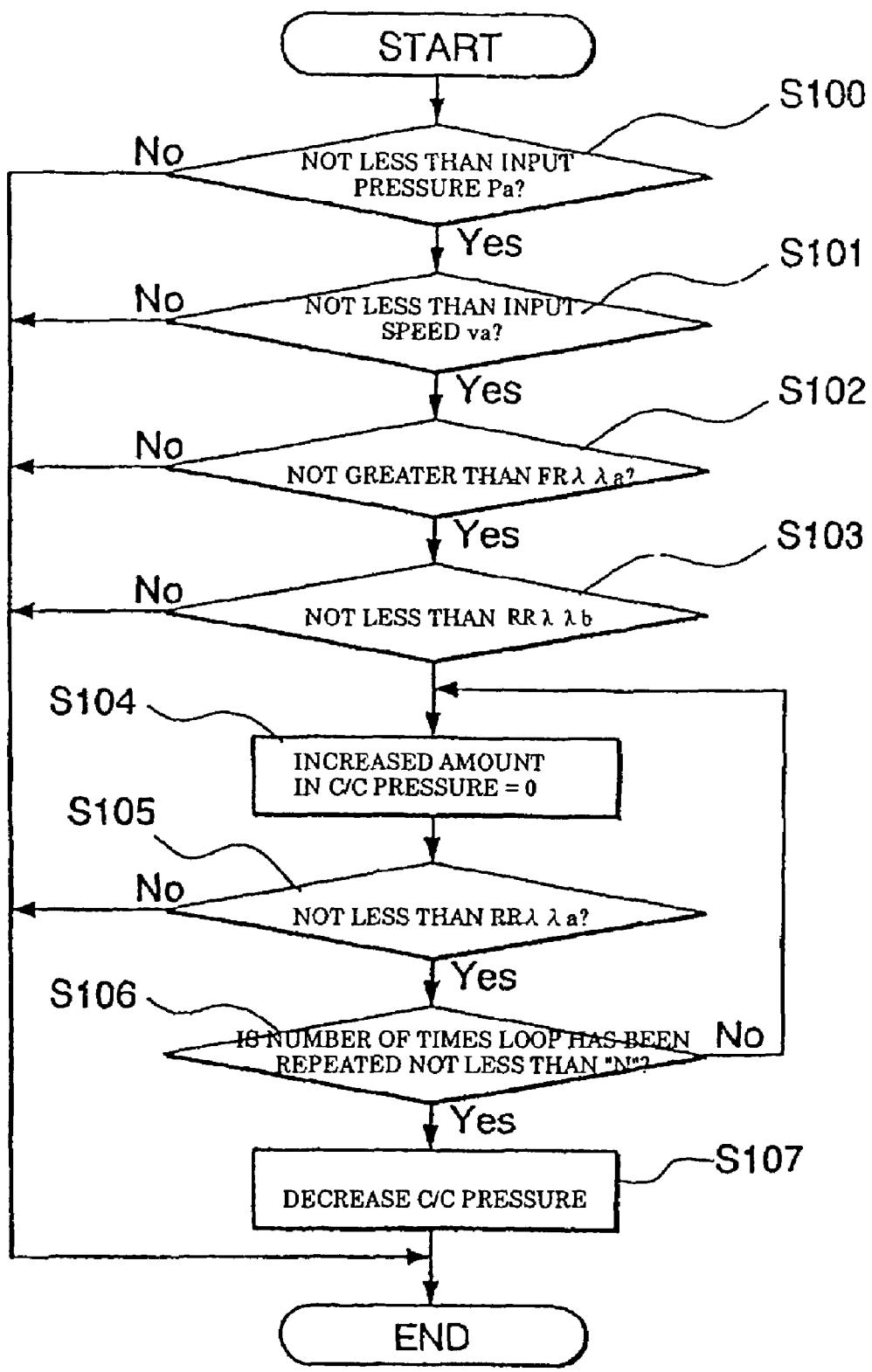
FIG. 14 is a flowchart showing the process for suppression of lowering of the rear wheel contact load as performed by the controller.

Specifically, in this braking device, the reduction of the rear-wheel load is suppressed by processing as shown in FIG. 14, for example.

Specifically, first, in Steps 100 and 101, it is determined whether or not a hydraulic pressure of the front wheel side brake circuit is not less than a set pressure Pa, and a vehicle speed is not less than a set speed va. When the both conditions are satisfied, in Step 102, it is determined whether or not the slip ratio on the front wheel side is not more than $\lambda a$. Subsequently, in Step 103, it is determined whether or not the slip ratio on the rear wheel side is not less than $\lambda b$. When the above four conditions are all satisfied, it is assumed that the reduction of the rear-wheel load is started. Accordingly, in Step 104, the current braking force on the rear wheel side is maintained as it is. Thereafter, in the next Step 105, it is determined again whether or not the slip ratio on the rear wheel side is not less than $\lambda b$. When the slip ratio is determined to be smaller than $\lambda b$ in Step 105, the processing skips subsequent steps (END). On the other hand, when the step ratio is determined to be not less than $\lambda b$, it is determined in the next Step 106 whether or not the number of times the loop has been repeated is not less than N. Here, if the number of times the loop has been repeated does not reach N, the processing returns to Step 104 to increase the number of times the loop has been repeated by 1. Meanwhile, when the loop has been repeated N times (in other words, if the slip ratio has not been reduced to below $\lambda b$ even after a predetermined time), a braking pressure on the rear wheel side is reduced in Step 107.

Figure 15:
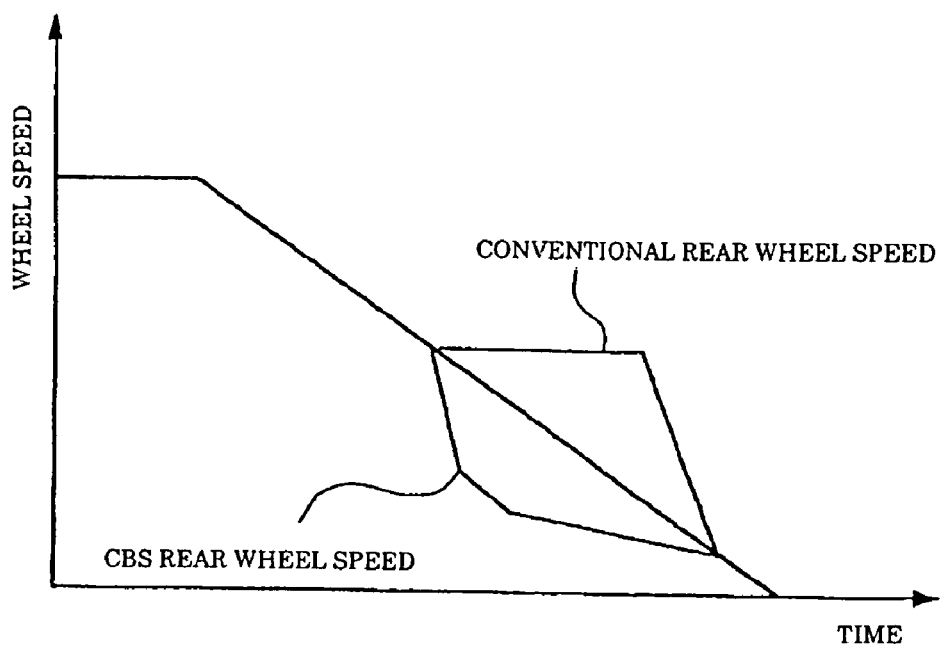
FIG. 15 is a rear wheel speed characteristic view comparing a brake system employing a CBS and that not employing a CBS, when a braking operation for a front wheel is performed.

Therefore, in the case of this braking device, additional reduction of the rear-wheel load when the braking operation on the front wheel side is performed can be prevented by the control as described above. Note that, in FIG. 15, changes in a wheel speed of the rear wheel at the time of the front wheel braking operation are compared between the case of independent braking on the front wheel side and the case of the CBS control. In the case of existing rear-wheel load detection means employed in a braking device having no CBS, a point where the deceleration gradient of a rear wheel speed becomes small is determined as the reduction of the rear-wheel load. Meanwhile, in the case of the braking device employing the CBS, since the deceleration gradient does not become small even if the rear-wheel load is reduced, the existing technology cannot be directly applied thereto. However, the braking device of this embodiment can accurately determine the reduction of the rear-wheel load as described above.

Moreover, in the case of performing the CBS control in which the front wheel side is operated in conjunction with the braking operation executed on the rear wheel side, this braking device controls front wheel side braking force distribution as described below.

Figure 16:
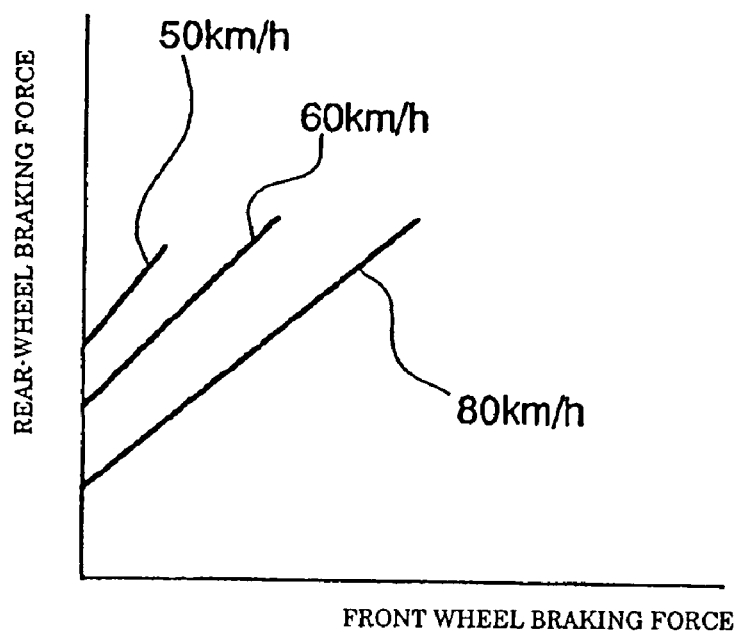
FIG. 16 is a braking force characteristic view for the front and rear wheels when a braking operation for a rear wheel is performed in the embodiment of FIG. 1.

Specifically, as shown in FIG. 16, distribution characteristics of front wheel braking force with respect to rear wheel braking force are previously determined for each vehicle speed. When a braking operation on the rear wheel side is started, the front wheel braking force is set to be consistently controlled by use of distribution characteristics that correspond to a speed when the braking operation is started. Thus, if a brake manipulated variable (for example, the hydraulic pressure on the input side of the brake circuit) on the rear wheel side is constant, braking force of a constant distribution ratio is to act on the front wheel side until the vehicle is stopped. As to the braking force distribution characteristics previously set for each vehicle speed, it is preferable that, for example, when the vehicle speed is 50 km/h, the front wheel braking force is maintained at zero until rear wheel braking force (hydraulic pressure) reaches a certain value. Thereafter, the front wheel braking force is increased according to an increase in the rear wheel braking force when the rear wheel braking force exceeds the value. A starting point of the distribution of front wheel braking force and a distribution ratio of the front wheel braking force are preferably to increase, respectively, as the vehicle speed increases to 60 km/h and to 80 km/h. Moreover, in this case, when the vehicle speed is lower than a certain speed (for example, 50 km/h), there is no braking force distribution to the front wheel.

Figure 17:
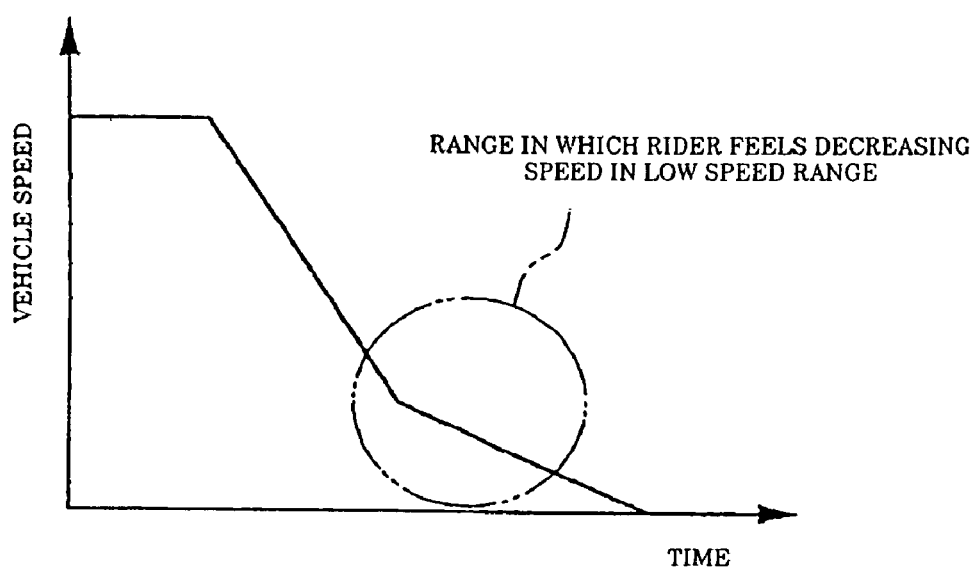
FIG. 17 is a vehicle speed decrement characteristic view when a braking operation for a rear wheel is performed in a prior art braking system, for a comparative example.

In the case of this braking device, in the CBS control of the rear wheel side braking operation, the front wheel side braking force is consistently controlled by use of the braking force distribution characteristics corresponding to the vehicle speed when the braking operation is started. Thus, even if the rear wheel side braking operation is performed from a high-speed driving state, as shown in FIG. 17, the deceleration gradient does not drastically change in the middle. Therefore, the rider does not feel uncomfortable during the braking operation.

Moreover, in this braking device, when the braking operation is performed during the high-speed driving, the front wheel side braking force distribution is increased. Thus, the braking efficiency is improved. On the contrary, when a braking operation is performed during low-speed driving, the front wheel side braking force distribution is reduced (including the case of zero). Thus, the front wheel braking force never affects driving at the time of passing through between vehicles, and the like.

Note that the braking force distribution characteristics previously set for each vehicle speed are not limited to those shown in FIG. 16, but are arbitrary. For example, the braking force distribution characteristics may be set in such a manner that the front wheel side braking force distribution is rapidly increased when a brake manipulated variable (braking force) on the rear wheel side exceeds a certain value at each speed. In this case, a quicker braking effect can be obtained at the time of a braking operation requiring a sudden stop, and the like.

While a working example of the present invention has been described above, the present invention is not limited to the working example described above, but various design alterations may be carried out without departing from the present invention as set forth in the claims.

We claim:

1. A braking device for a motorcycle, in which a front wheel braking mechanism is operated in conjunction with a braking operation on a rear wheel, the braking device comprising
plural pre-set braking force distribution characteristics for correlating operations of the rear and front wheels, said plural pre-set braking force distribution characteristics including a unique characteristic for each of a plurality of vehicle speeds, such that when the braking operation on the rear wheel is performed, the front wheel braking mechanism is controlled so as to maintain a braking force distribution characteristic selected from the plural pre-set braking force distribution characteristics and corresponding to a vehicle speed at the time the operation is started.

2. A combined brake system for a two-wheeled motor vehicle having a front wheel and a rear wheel, the combined brake system comprising
a wheel braking mechanism for each of the front and rear wheels;
an electrically-operated actuator for generating hydraulic pressure;
a hydraulic pressure modulator for each of the front and rear wheels which respectively supplies the hydraulic pressure generated by the electrically-operated actuator to the wheel braking mechanism for each front and rear wheel;
a controller for electrically controlling supplying of the hydraulic pressure from the hydraulic pressure modulators to the corresponding wheel braking mechanism in response to a riding condition for a vehicle and a braking operation,
wherein when a braking operation for a rear wheel is coupled with wheel braking mechanism for a front wheel, and when braking is controlled by the controller, a distribution characteristic of a braking force for a front wheel to a braking force for a rear wheel is determined in advance for each of a plurality of vehicle speeds such that plural distribution characteristics are provided, and one of said distribution characteristics is selected depending on vehicle speed.

3. The combined brake system for a two-wheeled motor vehicle of claim 2, wherein when a braking operation for the rear wheel staffs to be performed, the braking operation for the front wheel is controlled according to the distribution characteristic corresponding to a speed at the time of staffing the braking operation.

4. The combined brake system for a two-wheeled motor vehicle of claim 2, wherein no braking force is applied to the front wheel until a braking force at a rear wheel reaches a pre-determined value, and thereafter the braking force at the front wheel increases in response to an increase in the braking force at the rear wheel.

5. The combined brake system for a two-wheeled motor vehicle of claim 2, wherein the wheel braking mechanism is operated under pressure supplied from the hydraulic pressure modulator by way of a wire.

6. A method of controlling operation of a brake system in a two-wheeled vehicle having a front wheel with a front wheel braking mechanism, a rear wheel with a rear wheel braking mechanism, a fluid pressure sensor operatively associated with the front wheel braking mechanism; a controller which is operable to control the front braking mechanism, and a vehicle speed sensor, said method comprising the steps of:
a) sensing application of a braking force to the rear wheel braking mechanism in a braking operation initiated by a user of the vehicle;
b) sensing an instantaneous vehicle speed at the time of starting the braking operation;
c) selecting a braking force distribution characteristic from a plurality of predetermined distribution characteristics, based on the sensed instantaneous vehicle speed at the time of starting the braking operation; and
d) controlling a braking operation of the front wheel according to the selected braking force distribution characteristic.

7. The method of claim 6, wherein no braking force is applied to the front wheel until a braking force at a rear wheel reaches a pre-determined value, and thereafter the braking force at the front wheel increases corresponding to an increase in the braking force at the rear wheel.

8. The method of claim 6, wherein the wheel braking mechanism is operated under pressure supplied from a hydraulic pressure modulator by way of a wire.

9. The method of claim 6, wherein when a brake manipulated variable on the rear wheel side is constant, braking force of a constant distribution ratio is applied to the front wheel side until the vehicle is stopped.

* * * * *